Feb. 22, 1938.　　　　H. A. MARSH　　　　2,109,137
FILLER CAP FASTENER
Filed Aug. 4, 1936
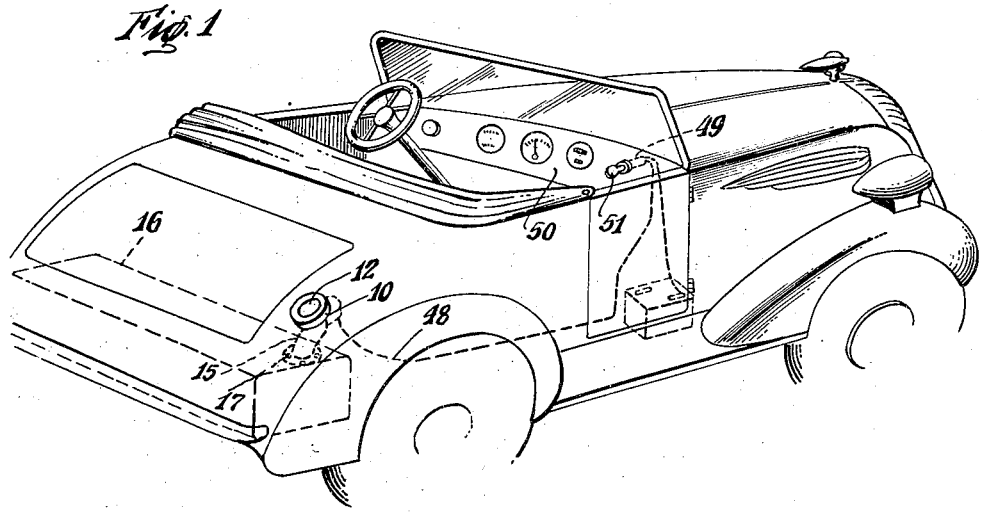
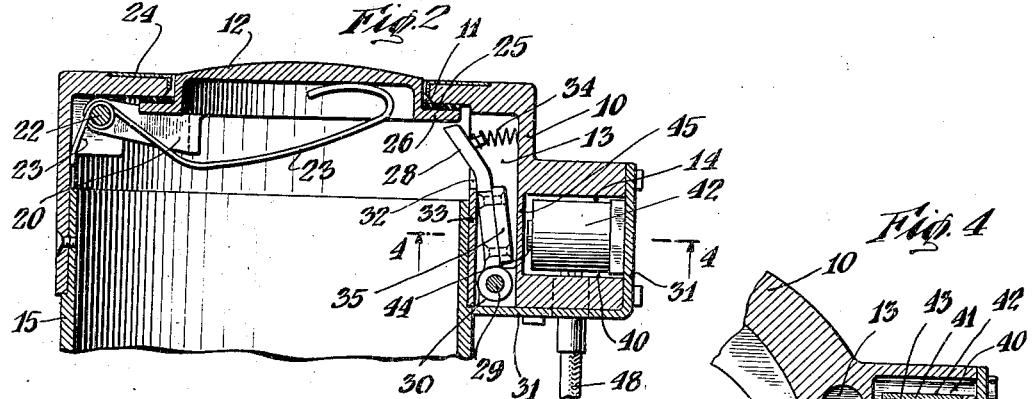
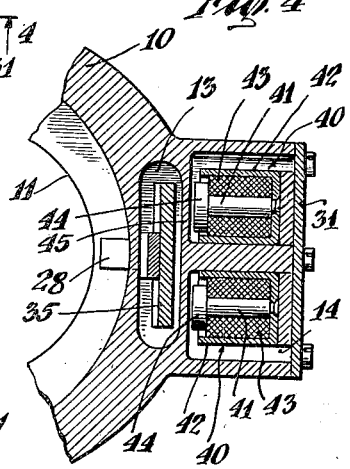
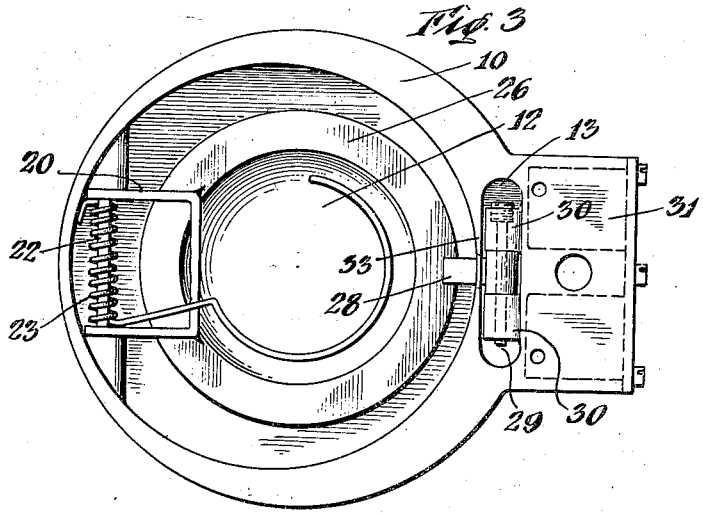
INVENTOR
Harold A. Marsh
BY
N. J. Leek
ATTORNEY Patented Feb. 22, 1938

2,109,137

UNITED STATES PATENT OFFICE 2,109,137

FILLER CAP FASTENER

Harold A. Marsh, Brooklyn, N. Y.

Application August 4, 1936, Serial No. 94,131

1 Claim. (Cl. 292—201)

This invention relates to filler caps for automobile gasoline tanks and the like and more particularly to a remote controlled locking device to prevent the filler cap from being opened by unauthorized persons.

An object of the invention is to provide a cheap, simple, convenient and dependable device of the type above indicated.

A feature of the invention consists in the provision of a latch for a filler cap which is controlled by an electromagnet operated by a remote switch, as for example on an automobile instrument board.

Another feature consists in the provision of electrical actuating means for a filler cap latch in which all wires and contacts are housed in a closed compartment and are not exposed to the contents of the tank.

Other features consist in the details of construction and combinations of parts hereinafter more fully set forth.

Although the novel features which are believed to be characteristic of this invention will be pointed out more fully in the claim appended hereto, the broader aspects of the invention will be better understood by referring to the following description taken in connection with the accompanying drawing in which one embodiment thereof has been set forth for purposes of illustration.

In the drawing

Fig. 1 is a perspective view of an automobile showing the relative location of the various parts in accordance with the present invention.

Fig. 2 is a longitudinal section through the filler cap and control mechanism.

Fig. 3 is a bottom plan view of the filler cap and

Fig. 4 is a section taken on line 4—4 of Fig. 2.

Referring to the drawing more in detail, the filler cap and control mechanism is shown as supported in a housing 10 which may comprise, for example, a casting of brass or other non-magnetic material. This housing 10 is provided with a central aperture 11 in which a cap 12 is seated. The housing also has a separate latch compartment 13 and a magnet compartment 14. The housing is secured to a filler pipe 15 leading to a gasoline tank 16 by suitable means such as rivets 17.

The cap 12 is mounted on a bracket 20 which is hinged to a pin 22 carried in the housing 10 and is provided with a spring 23 which normally holds the cap 12 is closed position. A lining ring 24 of steel or similar hard material is secured in the housing 10 around the aperture 11 in order to protect the housing from injury by the hose nozzle or the like which is inserted through the aperture. A sealing ring 25 may be carried by a flange 26 of the cap 12 in a position to engage the under side of the housing 10 around the aperture 11 for effecting a substantially tight seal when the cap is closed.

A latch 28 is mounted in the latch compartment 13 and is pivoted by a pin 29 which is carried in brackets 30 formed on a plate 31 which is adapted to be secured to the outside of the housing 10 for closing the latch compartment 13 and the magnet compartment 14. The latch 28 projects through a slot 32 formed in the wall 33 of the latch compartment 13 and may be held in position under the flange 26 of the cap 12 by a spring 34. In certain instances the device may be mounted so that the cap is held in latched position by gravity, in which case the spring 34 may be omitted. An armature 35 of magnetic material is attached to the latch 28 and is adapted to control the position of the latch in the manner to be described.

The magnet compartment 14 contains a pair of electro-magnets 40 having cores 41 and shells 42 which are secured to said cores and form the magnetic path. Coils 43 are suitably disposed about the cores 41. The cores 41 are provided with pole pieces 44 which are located adjacent the wall 45 separating the magnet compartment 14 from the latch compartment 13. The pole pieces 44 are preferably mounted closely adjacent said wall and the armature 35 is so located that it lies adjacent the wall when the electro-magnets are energized. The wall 45 is made of brass or other non-magnetic material so as not to interfere with the operation of the electro-magnets 40. Obviously this wall should be made thin so as to reduce the gap between the armature 35 and the pole pieces 44 to the lowest practical value. It is to be understood that a particular type of electro-magnet has been shown for purposes of illustration only and that any other suitable type may be employed.

The coils 43 are connected by a cable 48 to a switch 49 which may be mounted on the instrument board 50 of the automobile and may be actuated by a key 51. It is to be understood, however, that the switch 49 may be mounted in other locations and that a push button switch may be employed in the event that a key operated switch is not required.

It will be noted that in the above described device, the filler cap is normally latched and cannot be opened except when the latch is released by actuation of the switch 49. In that event it can be opened by merely pressing the hose nozzle against the cap. When it is desired to fill the tank, the operator of the car closes the switch 49 while the attendant is inserting the hose nozzle, thereafter the switch may be released and the filler cap will automatically return to latched position when the hose nozzle is removed. The cap accordingly prevents unauthorized opening of the gas tank, for any purpose. It is primarily intended for use on automobile gas tanks, but it may also be used for other purposes as, for example, on the exposed filler pipe of an oil tank supplying an oil burning domestic furnace with the switch located in the house.

In the embodiment shown, the cap opens inwardly. It is to be understood, however, that the cap may be mounted to open outwardly and may have spring means to maintain full open or full closed position as desired. The latch may operate automatically on closing or may be arranged to close in response to an electromagnetic impulse.

Although a practical embodiment of the invention has been shown for purposes of illustration, it is applicable for various uses. Various changes and modifications may be made therein without departing from the scope of the invention which is limited only in accordance with the following claim when interpreted in view of the prior art.

I claim:

A fastener construction for a filler pipe closure including a housing having a bore fitting on said filler pipe, separate magnet and latch compartments, a top provided with an aperture registering with said bore, a hinged cap closing said aperture, said cap being hinged to open inwardly and having a flange seating on the under surface of said top, and spring means normally holding said cap in closed position, said fastener construction comprising a pivoted latch in said latch compartment normally underlying the free edge of said cap to hold the same in closed position, an armature of magnetic material carried on said latch, an electromagnet in said magnet compartment cooperating with said armature to release said latch and a wall of nonmagnetic material separating said magnet compartment from said latch compartment to isolate said magnet compartment whereby any vapors within said pipe are prevented from coming in contact with any part of the electrical circuit, said electromagnet, when energized, acting through said wall to attract said armature so as to release said latch and permit said cap to open inwardly.

HAROLD A. MARSH.